United States Patent [19]

McMorris

[11] Patent Number: 4,736,929
[45] Date of Patent: Apr. 12, 1988

[54] WINCH HAVING SPLIT HOUSING AND DRIVE COMPONENTS

[75] Inventor: Michael L. McMorris, Milwaukie, Oreg.

[73] Assignee: Warn Industries, Inc., Milwaukie, Oreg.

[21] Appl. No.: 879,966

[22] Filed: Jun. 30, 1986

[51] Int. Cl.⁴ .......................... B66D 1/22; B66D 1/28
[52] U.S. Cl. .................................. 254/344; 254/323; 254/346; 254/362; 254/365
[58] Field of Search ............... 254/345, 344, 328, 323, 254/346, 365, 362

[56] References Cited

U.S. PATENT DOCUMENTS

| | | | |
|---|---|---|---|
| 1,684,185 | 9/1928 | Kittredge | 254/344 |
| 2,405,156 | 8/1946 | McIntyre | 254/345 |
| 3,319,492 | 5/1967 | Magnuson | 254/345 X |
| 3,776,518 | 12/1973 | Witwer | 254/344 X |
| 3,778,605 | 1/1974 | Johnson | 254/328 X |
| 3,876,183 | 4/1975 | Strout | 254/346 X |
| 4,161,126 | 7/1979 | Winzeler | 254/345 X |
| 4,452,429 | 6/1984 | Muessel | 245/345 X |
| 4,565,352 | 1/1986 | Hasselmann | 254/344 |

Primary Examiner—Stuart S. Levy
Assistant Examiner—Katherine Matecki
Attorney, Agent, or Firm—Robert L. Harrington

[57] ABSTRACT

A winch design for consumer applications wherein the planetary carrier assemblies are split between the two ends of the drum. The drum is mounted on heavy duty brackets and the housing elements surround the planetary carrier assemblies and also, independent of the drum, are mounted to the brackets. The housing elements are molded with the ring gear configured therein. They are produced from the same moldings. Interconnection as between the planetary carrier assemblies is through an interconnect shaft that is driven by the output shaft of the first planetary carrier assembly (coupled to the motor drive shaft) and carries the sun gear of the second planetary carrier assembly.

4 Claims, 3 Drawing Sheets

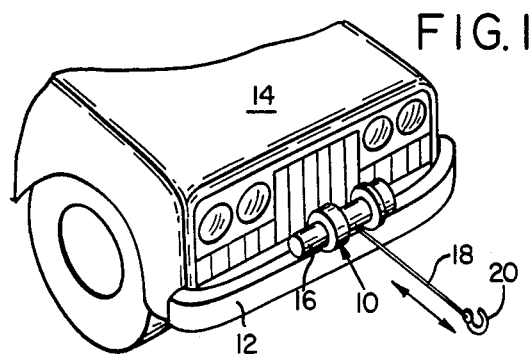
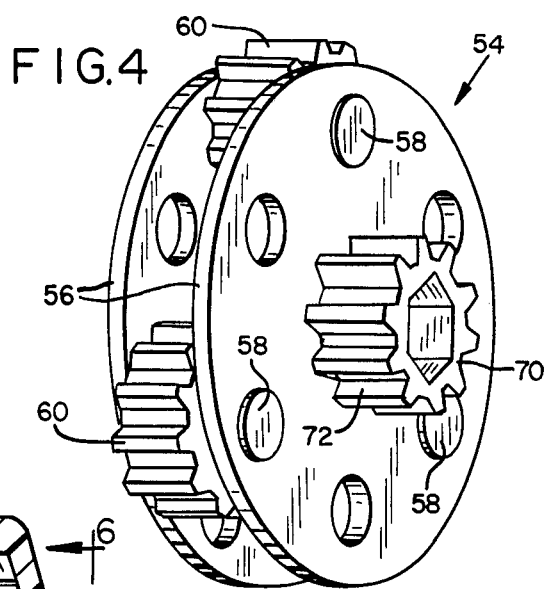
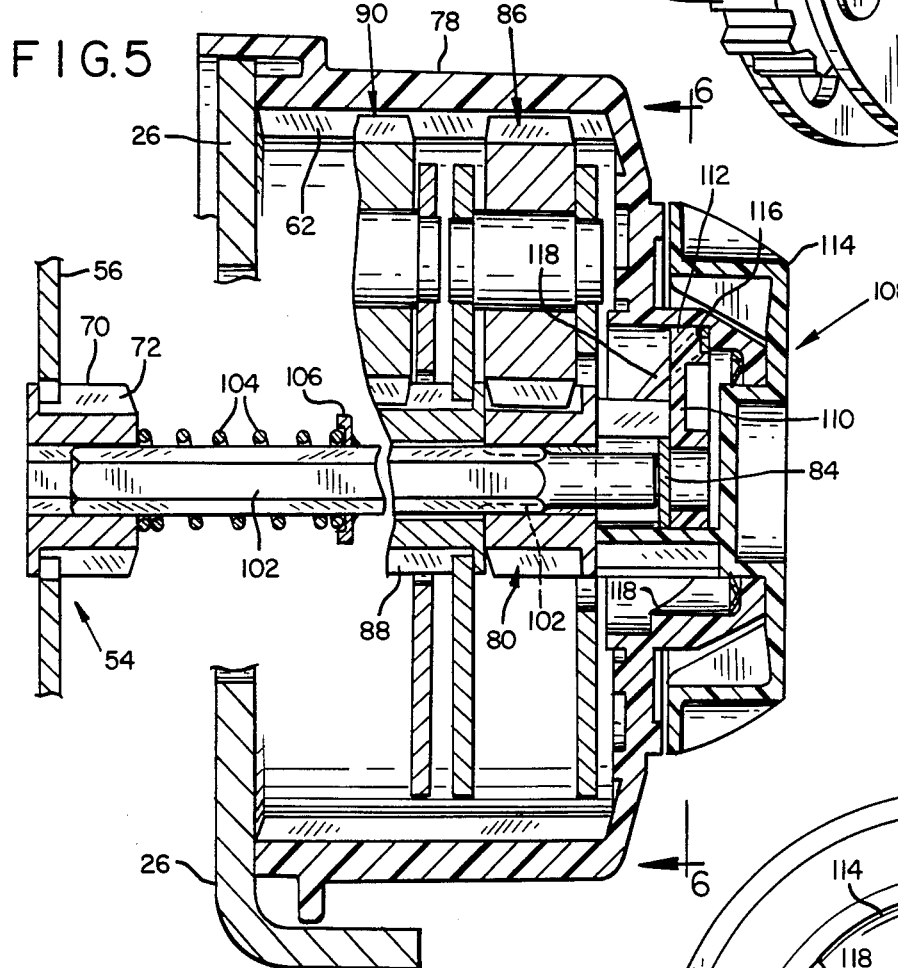
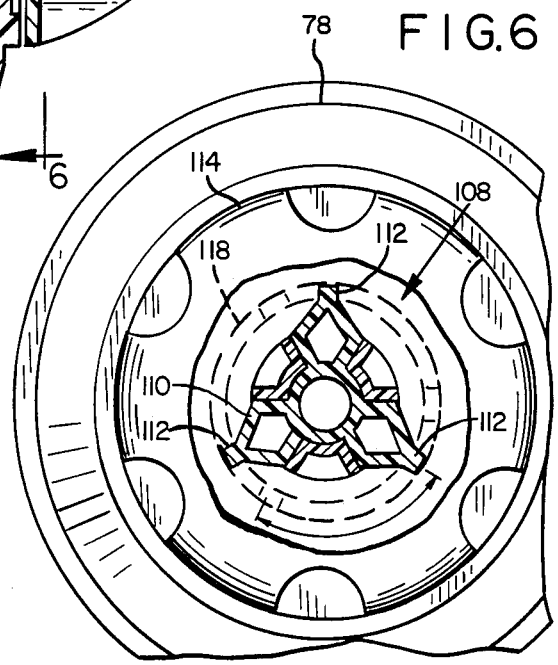

WINCH HAVING SPLIT HOUSING AND DRIVE COMPONENTS

FIELD OF INVENTION

This invention relates to a winch that is compact and durable yet inexpensive to manufacture, and particularly adapted for light weight applications e.g., as encountered by four wheel drive vehicle owners.

BACKGROUND OF THE INVENTION

Winches are typically designed for heavy duty applications and are constructed of expensively machined parts to withstand the forces they are expected to encounter. Whereas there are many potential uses for winches by consumers (for personal use as differentiated from commercial use), winches heretofore available have been either of the expensive variety (with expensively produced machined parts) and thus prohibitively costly for most consumer uses, or they were so limited in their capability as to be inadequate for many consumer winching needs.

BRIEF DESCRIPTION OF THE INVENTION

The present invention provides a unique design for a winch that enables the use of heavy duty steel where needed to withstand substantial loading of the winch, in combination with less expensive molded plastic, powder metal and stamped parts and the like, where high strength of the material is not as important a factor. A particular benefit of the invention is the achievement of common parts in a number of the sub assemblies of the winch. This commonality of parts dramatically reduces the production costs.

DETAILED DESCRIPTION AND DRAWING

The invention will be appreciated more fully by reference to the detailed description of the preferred embodiment which follows, and the accompanying drawings wherein:

FIG. 1 is a schematic illustration of a vehicle mounted winch of the type contemplated for the present invention;

FIG. 4 is a perspective illustration of a planetary carrier assembly, one of the components of FIG. 2 but taken from the opposite side shown therein;

FIG. 5 is a cross sectional view of the mechanism of an alternate embodiment of the invention; and FIG. 6 is a view as taken on view lines 6—6 of FIG. 5.

Figure 2:
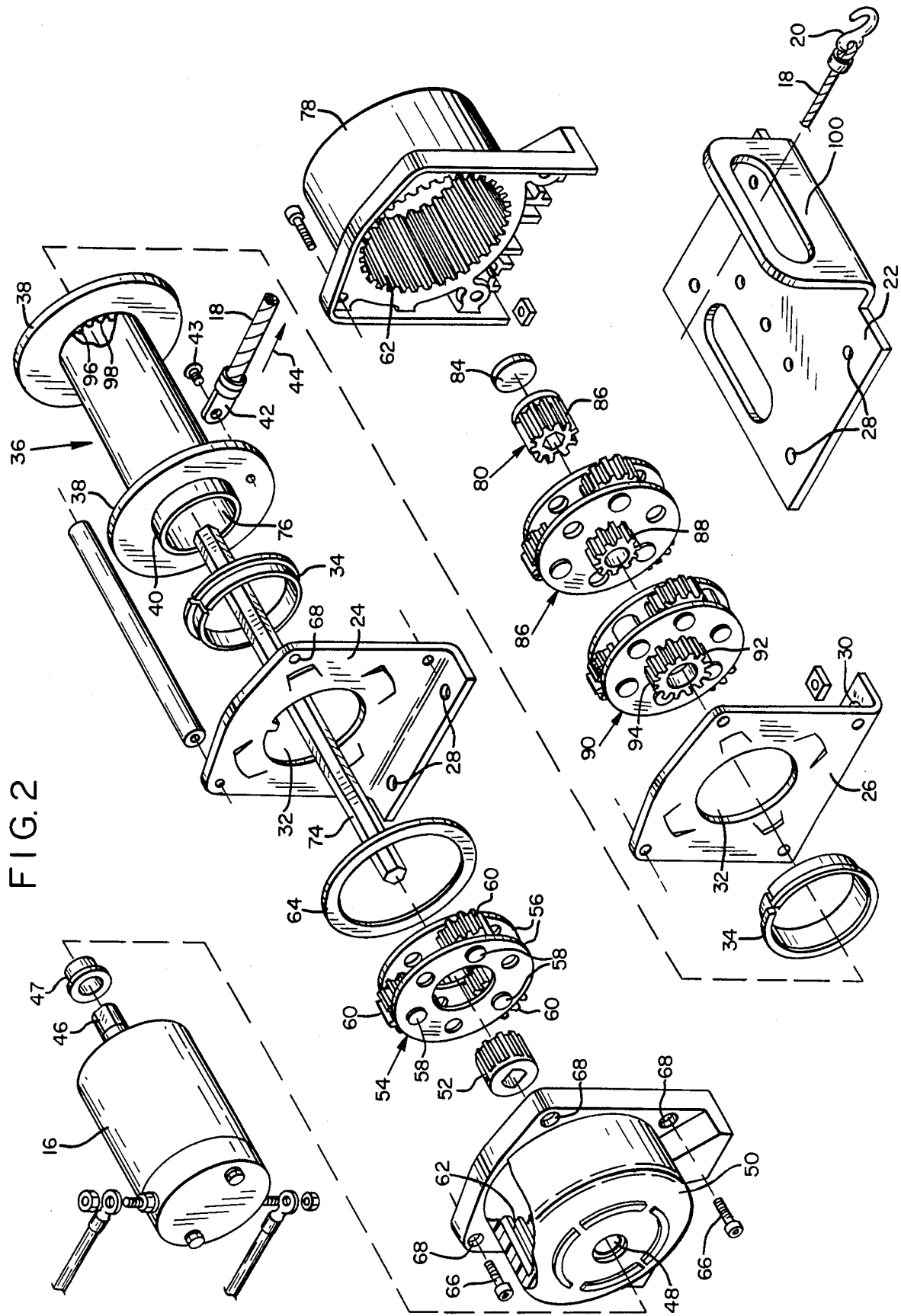
FIG. 2 is an exploded perspective illustration of the components of the preferred embodiment of the invention.

Reference is made to FIG. 1 which is presented simply to describe the product of the invention and an example of a contemplated application. As shown, a winch 10 is mounted to the front bumper 12 of a vehicle 14. Vehicles of the type normally provided with winches i.e. four wheel drive vehicles, are often provided with bumpers having a center platform to which a winch can be mounted. If not provided, such bumpers are available or the bumper provided can be modified by a competent vehicle body shop. At any rate, the product of the invention presumes the availability of a sturdy platform to which a winch can be mounted.

Winches of the type contemplated are used by hunters, firewood cutters, campers etc., who are likely to venture off the main roads and who will often encounter the need for dragging objects to the vehicle, or should the vehicle become stuck in mud or snow, to assist in getting the vehicle un-stuck. Of course there are many other applications where light weight winching is desirable including many of the winching needs around the typical farmyard. At any rate, it will be understood that the winch 10 is provided with power means (e.g. an electric motor 16 that runs off the vehicle's battery) for turning the winch's spool and thereby winding in the wire rope 18. The wire rope 18 is typically provided with a hook 20 (to hook onto the desired object).

Reference is now made to FIG. 2 wherein the components of the preferred winch of the invention is illustrated in exploded view. First the "loaded" components will be referred to i.e. those components which take the brunt of the pulling force and which are made of stress accommodating materials e.g. steel. A base plate 22 is mounted to the bumper 12 and left and right end brackets 24, 26 are mounted to the base plate 22 (or rather, common bolts passed through aligned left and right bolt openings 28, 30 mount the base plate and end brackets to the bumper). The end brackets are provided with bearing openings 32 with ring bearings 34 adapted to be mounted therein. A wire rope spool or drum 36 has end flanges 38 that confine the wire rope 18 to the drum, and bearing rims 40, extended from each end, are adapted to mount inside the bearing rings 34. The wire rope 18, as shown, carries a fastening clamp 42 that fastens to a flange 38 of the drum (e.g. with a screw 43). The components just described make up what is referred to herein as the loaded components i.e. the load being a resisted pulling load 44 on the wire rope 18, which, being wound on the drum 36, transfers the load to the drum and through the drum to the brackets 24, 26. These components are preferably produced of strong metal material e.g. steel.

The components of the winch that transmit the rotative driving force from the output shaft 46 of motor 16 to rotate the drum 36 which in turn winds the wire rope 18, will now be described. The output shaft 46 projects through a bushing 47 and then end opening 48 of a molded housing section 50. Mounted to the output shaft 46 inside housing section 50 is a first sun gear 52. Mounted to the sun gear 52 is a first planetary gear assembly 54.

Figure 3:
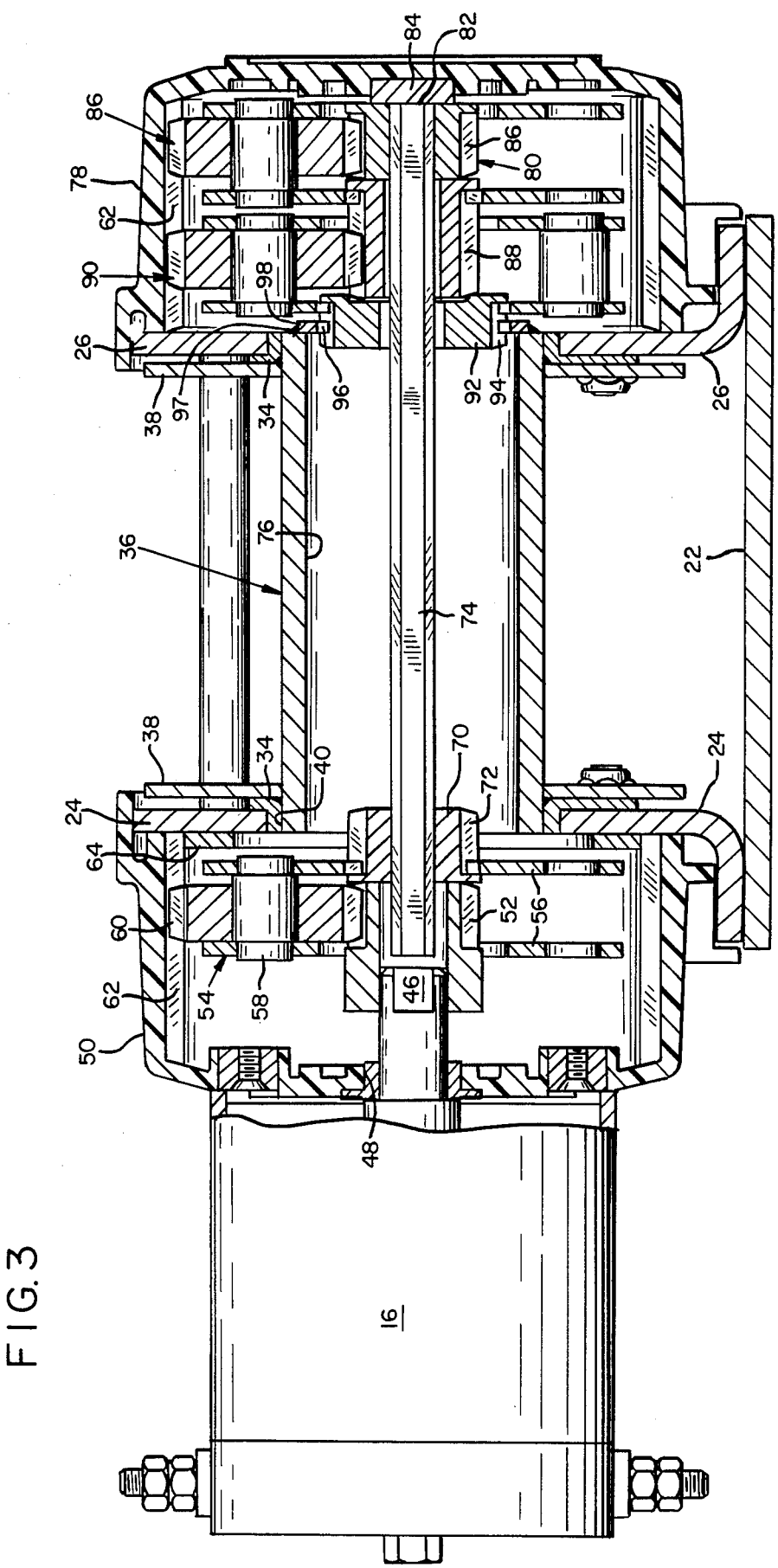
FIG. 3 is a sectional view of the assembled winch of FIG. 2.

In the illustrated winch, there are three planetary carrier assemblies having similar construction. Each is provided with plates 56 (not necessarily identical to each other) that mount between them, on pinions 58, planet gears 60. The planet gears 60 are rotatably mounted on the pinions 58 which also function as separators to maintain the separation of the plates 56 and thereby allow free rotation of the planet gears 60. The gear teeth of the planet gears are inter-engaged with the sun gear 52 and with gear teeth 62 formed in housing section 50. (See also FIG. 3.) The housing section 50 is mounted to bracket 24 (over washer 64) with bolts 66 projected through aligned bolt holes 68.

Reference is now also made to FIG. 4 which shows the opposite side of the planetary carrier assembly and particularly illustrating the output shaft 70 of the planetary carrier assembly. This output shaft 70 has splines 72 that engages mating splines of the associated plate 46. As between the three planetary carrier assemblies, the output shaft 70 is the primary difference which will become apparent from the following description.

The output shaft 70 of the first planetary carrier assembly has a configured inner opening adapted to mate with a hexagonal shaft 74. Shaft 74 is thus rotatably driven by the first planetary carrier assembly 54. The shaft 74 projects into a center opening 76 and thus through the drum 36 and into a second housing sectin 78, also fitted with gear teeth 62. The shaft 74 is fitted with a sun gear 80 and the end 82 of the shaft 74 engages thrust bearing 84 that is seated in the end wall of the second housing section 78. (See FIG. 3.) The gear teeth 86 of sun gear 80 inter-engage with the gear teeth of planet gear 60 of a second planetary carrier assembly 86 (the teeth of which also engage teeth 62 of the second housing sectin 78). The output shaft 88 of the second planetary gear assembly 86 (also spline fitted to its associated plate 56) has a center opening that is larger than shaft 74 and thus does not interfere with the driving inter-engagement between it and sun gear 80.

The outer configuration of output shaft 88 is formed into a third sun gear that is inter-engaged with the planet gears of a third planetary carrier assembly 90. (The gear teeth of the planet gears also being inter-engaged with gear teeth 62 of the second housing section 78.) The output shaft 92 of the third planetary carrier assembly 90 also has an inner opening larger than shaft 74 and does not interfere with rotation thereof.

Output shaft 92 has splines 94 that are projected through the opening 32 in the right bracket 26. The splines 92 are mated with splines 96 formed in a drive ring 98 that is welded or otherwise affixed to the end 97 of drum 36. Thus it will be appreciated that the rotative motion of output gear 92 is directly transferred to the drum 36. The housing element 78 is of course fixed to right bracket 26 in the same manner as housing element 50 is affixed to left bracket 24.

OPERATION

The operation of the winch will now be reviewed. The motor 16 is capable of rotating shaft 46 in either direction i.e. for winding and unwinding the wire rope 18 onto and off of drum 36 as desired. Shaft 46 is engaged with sun gear 52 which rotates the planet gears 60 of the first planetary carrier assembly 54. Gears 60 being also inter-engaged with gear teeth 62 of housing element 50 (which gear teeth 62 thus function as a ring gear) force turning rotation of the entire planetary carrier assembly. The purpose of the planetary carrier assembly is of course to reduce the rotation of the output 46 of the motor 16. Thus depending on the ratio of the number of gear teeth 62, to the number of gear teeth on sun gear 52, the sun gear 52 has to rotate a number of times in order for the planetary gear assembly to make one complete revolution. That reducion e.g. of five to one, is transferred by output shaft 72 of the carrier assembly to shaft 74 and then to sun gear 80. Sun gear 80 engages the planet gears of planetary carrier assembly 86 and with the same five to one ratio of reduction between gear teeth 62 in second housing section 78 and gear teeth 86, output shaft 88 turns at 1/5th the rotative rate of gear 80 and 1/25th of the rate of output shaft 46.

Output shaft 88 functions as the sun gear to the third planetary carrier assembly 90 and turns drive gear 92 at 1/5th its speed. Output shaft 92, being directly splined to drum 36, thus rotatably drives the drum 36 at 1/125ths the rotative speed of drive shaft 46 of the motor 16. The motor 16, being rotatably drivable in either direction, winds and unwinds the wire rope 18 from the drum 36 through the fairlead 100 of the base plate 22 (FIG. 2).

Whereas this rotative rate is substantially reduced to generate the power necessary for pulling a heavy object toward the vehicle 14, the unwinding process has very little resistance and it may be desireable to disconnect the drive mechanism from the drum to allow the wire rope to be manually unwound. Such is provided in the alternate embodiment described hereafter.

ALTERNATE EMBODIMENT

In an alternate embodiment, illustrated in FIGS. 5 and 6, means are provided to disconnect the second planetary gear assembly from the shaft 102 (corresponding to shaft 74 above) thus disconnecting the first and second planetary gear assemblies. Shaft 102 is allowed limited axial movement between a far left or retracted position (shown in dash lines) with the hexagon configuration of the shaft disconnected from sun gear 80, and a far right or engaged position (shown in solid lines) with the hexagon configuration of the shaft connected to sun gear 80. A spring 104 compressed between the first planetary carrier assembly and a retainer 106 on the shaft 102, urges the shaft 102 toward the interconnected position.

Mounted to the outside of housing element 78 is a cam activated disconnect mechanism 108. A cam follower 110 including three cam following fingers 112, is axially slidable but rotatably fixed relative to a cap 114. The thrust bearing 84 is carried by the follower 110 and remains in continuous engagement with the end of the shaft 102. The cap 114 surrounds the cam follower 110 and is axially fixed but free to rotate relative to the housing. Cap 114 has a cavity that allows axial movement within the cap. Provided in the housing 78 are cam surfaces or ramps 118 positioned in engagement with each of the cam following fingers 112, i.e., at interface points 116 in FIG. 5. The ramps 118 extend right to left. Forcing the fingers down the ramp surfaces 118 i.e. by turning the cap, forces rearward movement of the cam follower 110 in the cavity of the cap 114. Thus it will be appreciated that manually turning cap 114 clockwise (as viewed in FIGS. 5 and 6) causes rotative movement of the fingers 112 relative to ramps 118 to force the fingers to the left within the cavity of the cap. Counterclockwise movement of the cap allows the cam follower to move to the right. This movement is urged by spring 104, (acting against shaft 102, which abuts thrust bearing 84 carried by the cam follower).

INVENTIVE CONCEPT

The inventive concept of this invention is believed to reside in several areas. Splitting the planetary carrier assemblies so as to place them on both sides of the drum is believed to have a very significant benefit. Whereas molding long splines in a housing section (e.g. extensions of spline 62) is impractical, the present invention avoids the problem by generating the interconnection of shaft 74 (102) to allow the planetary carriers to be located at both sides of the drum. The planetary carrier assemblies and other sub assembly parts of the winch have common parts that can be mass produced and fit into the various assemblies at substantially reduced manufacturing cost. Similarly, housing elements 50 and 78 are essentially identical except only for the access holes for drive shaft 46 and mechanism 108. The above spliting of planetary carrier assemblies to provide for molded housing elements, e.g., of plastic nylon, is made feasible by reason of the direct support for the drum 36 through the mounting brackets 24, 28 and base 22. The invention is however, considered to be broader than the specific examples herein described, and accordingly the scope of the invention is specifically defined in the claims appended hereto.

I claim:

1. A winch comprising; a pair of heavy duty support brackets with center openings, a drum, mounting means for rotatably mounting the drum to the support brackets, said drum having a center opening aligned with the openings in each bracket, first and second housing sections mounted to the pair of support brackets, each of said housing sections defining a circular inner wall, and gear teeth provided on the inner wall of each housing section forming ring gears, first and second planetary gear assemblies mounted in the first and second housing sections, each said planetary gear assembly having a sun gear, planet gears, and an output shaft, the planet gears of each planetary gear assembly interengaged with the ring gear of the respective housing section whereby rotation of the sun gear forces planetary rotation of the planet gears at a reduced rate of rotation and corresponding reduced rate of rotation of the output shaft, a connecting shaft extended between the output shaft of the first planetary gear assembly and the sun gear of the second planetary gear assembly, the output shaft of said second planetary gear assembly connected to the drum for rotatably driving the drum, a motor having a drive shaft connected to the first planetary gear assembly for rotatably driving the said first planetary gear assembly at a reduced rate of rotation, and said output shaft thereof connected through the connecting shaft to said second planetary gear assembly for driving the second planetary gear assembly and the connected drum at a further reduced rate of rotation, and said housing sections and support brackets having independent exclusive functions, the housing sections exclusively functioning as housing for the planetary gear assemblies, and the support brackets exclusively functioning as support for the drum whereby the structure of the housing sections is distinguishable from the structure of the support brackets, the housing sections each formed of relatively lower cost one-piece molded plastic and the support brackets formed of higher strength metal.

2. A winch as defined in claim 1 wherein the housing sections are substantially similar in configuration and the planetary gear assemblies are substantially similar in configuration, said similarities permitting commonality of production.

3. A winch as defined in claim 1 including a third planetary gear assembly in the second housing section between the second planetary gear assembly and the drum, said third planetary gear assembly interengaged with the ring gear formed in the second housing section, the sun gear of said third planetary gear assembly having a center hole larger than the connecting shaft and driven by the output shaft of the second gear assembly, the output shaft of said third planetary gear assembly being connected to the drum for rotative driving engagement therewith.

4. A winch as defined in claim 1 including a manual disconnect mechanism mounted to the second housing section outside the second planetary gear assembly, said disconnect mechanism including a cap axially fixed and rotatably mounted to the housing section, a cam follower having nonrotative and sliding axial relationship to the cap, camming surfaces on the second housing section engaged by the cam follower whereby a turning force applied to the cap causes axial sliding of the cam follower, said connecting shaft abutted against the cam follower and biasing means biasing the connecting shaft toward the cam follower to follow thereby the axial movement of the cam follower and position the connecting shaft between two axial positions, said connecting shaft being engaged and disengaged from the sun gear of the second planetary gear assembly upon movement between the two axial positions, and said cap exposed outside the housing section for manual turning of the cap and thereby axial re-positioning of the follower and connecting shaft.

* * * * *